3,289,759
PROCESS FOR TRANSPORTING SURFACTANTS THRU PERMEABLE STRATA

Henry B. Fisher, Bartlesville, Okla., assignor to Phillips Petroleum Company, a corporation of Delaware
No Drawing. Filed Dec. 23, 1963, Ser. No. 332,864
5 Claims. (Cl. 166—9)

This invention relates to a method or process for transporting surface active agents thru permeable subterranean strata, such as oil reservoirs, and particularly in water-flooding operations.

Although the addition of surface active agents to the water used in water-flooding operations increases the ultimate recovery of oil, such recovery methods are usually prohibitively expensive because of the tendency of most surface active agents to be adsorbed on the surfaces of the rock in the formation being treated. As a result, the advancing water front is depleted of the surface active material before any great beneficial effect can be realized. To alleviate this difficulty it has been proposed that there be injected into the oil reservoir a non-surfactant material which undergoes reaction in the formation to give a surface active agent. Thus, adsorption occurs only as the surface active agent is formed, thereby permitting the agent to be carried farther into the formation. For example, U.S. 2,841,222 teaches injecting into the formation a non-ionic surfactant-alkaline earth metal halide complex which decomposes in situ upon dilution by the saline formation water, the liberated surfactant then being adsorbed on surfaces within the reservoir. However, once the surfactant is adsorbed, its further transport through the formation is too slow to be beneficial.

This invention is concerned with a method of transporting a surface active agent through a permeable stratum with alternate sorption and desorption of the agent on and from the stratum.

Accordingly it is an object of the invention to provide a process for transporting a surfactant through a permeable stratum with alternate sorption on the stratum and desorption therefrom. A further object is to provide a process for improving the oil recovery in a water-flooding operation. Other objects of the invention will become apparent upon consideration of the accompanying disclosure.

In accordance with my invention, the transport of a surface active agent through an oil reservoir in a water-flooding operation is enhanced by the alternate injection thru an injection well of (1) a substance which chemically interacts with the surfactant to give a product less readily adsorbed and (2) another substance which regenerates the original surface active agent. Thus, a previously injected surface active agent, primarily adsorbed on reservoir surfaces near the injection well, is desorbed from these surfaces by interaction with a subsequently injected material to give a substance possessing essentially no surface active properties. After this desorbed material in its non-surfactant form has been transported a predetermined distance through the reservoir, another substance is injected to regenerate the surface active agent, which is then free to aid in releasing oil from a portion of the formation more removed from the injection well. These adsorption and desorption processes may be continued as many times as desired, until the surfactant has been transported all the way to the producing well.

In a preferred embodiment of this invention, there is first injected into the oil reservoir a solution of a non-ionic surfactant in fresh water or in water containing sodium chloride. This non-ionic surfactant preferably has the formula $$RO(CH_2CH_2O)_nCH_2CH_2OH$$

in which $n$ is an integral number ranging from 3 to 30 and R is an organic radical selected from the group consisting of alkaryl, fatty acid and mixed acid residues, and the partial esters of hexatyl anhydride and a fatty acid. The surfactant is adsorbed on the reservoir rock, thus accomplishing its mission of altering the wettability of the rock and thereby facilitating the movement of oil contained therein. The solution of surfactant is then followed by an aqueous solution of an alkaline earth metal halide such as the chloride or bromide of calcium or magnesium, preferably calcium chloride, resulting in rapid removal of the adsorbed surfactant through formation of a surfactant-alkaline earth metal halide complex, which readily moves forward in the reservoir. After the complex has been pushed a sufficient distance into the reservoir, an aqueous solution of sodium chloride is injected into the formation. Less desirably, fresh water may be substituted for this salt solution. Dilution of the solution of complexed surfactant in the reservoir, both by the displacing fluid and by the aqueous fluid ahead of the complex, effects decomposition of the complex, permitting the free surfactant to be adsorbed and to once more function as an oil-release agent. The injection of consecutive slugs of calcium chloride solution and sodium chloride solution (or fresh water) may be repeated as many times as desired, thereby rapidly transporting the surfactant through the reservoir.

Examples of alkaryl radicals are methyl phenyl, ethyl phenyl, isopropyl phenyl, iso-octyl phenyl, dodecyl phenyl, cetyl phenyl, eicosyl phenyl, and the like.

Fatty acids to be used in the process include capric, lauric, myristic, palmitic, stearic, oleic, erucic, behenic, and the like. The mixed acids include these same acids and such as abietic acid, tall oil acids, and the like.

Partial esters for use in the invention are those prepared from the aforementioned fatty acids and a hexatyl anhydride or dehydrated hexitol such as sorbitol, mannitol, dulcitol, iditol, and the like.

The principal preferred form of the non-ionic surfactant employed in the present invention is that in which R is an isooctyl phenyl radical and in which $n$ is about 14.

In applying the process to the improvement of oil recovery in a water-flooding operation, the concentration of surfactant used in the injected solution is usually in the range of about 0.0001 to 30 percent and preferably 0.1 to 10 percent. The amount of aqueous solution of the surfactant to be used depends upon the character of the stratum in which the operation is effected but is usually in the range of 0.05 to 10 pore volumes, preferably in the range of 0.1 to 5 pore volumes. Ordinarily, it is desirable to contact the porous stratum with a surfactant material for a distance of at least several feet from the injection well and preferably up to 15 to 25' radially from the well. As the annular body of injected aqueous surface active material is then displaced and driven deeper into the stratum, the circumference of the annulus substantially increases as the surfactant material is transported toward the surrounding production wells. This means that the radial width of the annulus materially decreases as the process continues until it converges toward the production well and emphasizes the need for establishing an original annulus of substantial radial width or depth in the formation.

A similar concentration of alkaline earth metal halide (0.0001 to 20 percent and preferably 0.01 to 10 percent) is usually used in the process. The quantity of this halide injected into the stratum is in the range of 0.05 to 5 pore volumes and preferably 0.1 to 1.0 pore volume of the flooding pattern.

The broad range of concentration of the sodium chloride is 0 to 5 percent and preferably 0.01 to 3 percent of the solution. The quantity injected depends upon the quantities of surfactant and alkaline earth metal halide injected and is usually in the range of 0.05 to 5 and preferably 0.1 to 1 pore volume of the flooding pattern.

In a water-flooding operation applied to a well pattern of 40 acres divided into 4 ten acre squares with a production well at the center of each ten acres and an injection well at the center of the pattern wherein the oil-bearing stratum has a thickness of 30' and a pore volume of 20 percent, about 1/10 pore volume of flood water containing the alkaryl surfactant preferred in the invention in a concentration of 0.5 weight percent is pumped into the injection well. The quantity of solution amounts to 47,000 barrels. Following the injection of the surfactant solution, 1/10 pore volume of flood water containing 0.3 weight percent calcium chloride is injected, amounting to about 47,000 barrels. Following the injection of calcium chloride, a similar amount of flood water containing sodium chloride in a concentration of 3/10 weight percent is injected into the stratum through the injection well and this injected slug is followed by the injection of another slug of calcium similar to the first slug thereof. The flooding operation is continued with the injection of alternate slugs of calcium chloride and sodium chloride until the production of the first slug in the production wells occurs. At this time any available flood water such as that recovered from the produced fluid is injected through the injection well to continue the production of oil as long as practical. Obviously, oil is produced during the full sequence of operations and the movement of the surfactant through the stratum with alternate sorption and desorption on and from the rock or sand increases the production of oil over that obtained with ordinary water flood.

A variation in the foregoing process comprises first injecting flood water containing the complexed surfactant (the alkaline earth metal halide complex) and then injecting flood water containing sodium chloride to free the surfactant for sorption on the rock or sand. These steps are followed by repeating injection of slugs of aqueous alkaline earth metal halide and sodium chloride as before.

Certain modifications of the invention will become apparent to those skilled in the art and the illustrative details disclosed are not to be construed as imposing unnecessary limitations on the invention.

I claim:
1. A process for transporting a non-ionic surfactant thru a permeable subterranean stratum which comprises the steps of:
   (1) injecting into said stratum thru a well therein, a solution of said surfactant in an aqueous medium selected from the group consisting of fresh water and an aqueous solution of sodium chloride, thereby causing sorption of said surfactant on the stratum;
   (2) thereafter, injecting into said stratum thru said well, an aqueous solution of at least one alkaline earth metal halide so as to convert said surfactant to the corresponding surfactant-alkaline earth metal halide complex and desorb same;
   (3) pushing the complex formed in step (2) deeper into said stratum by injection of fluid thru said well;
   (4) thereafter, injecting into said stratum thru said well aqueous liquid selected from the group consisting of fresh water and a solution of sodium chloride so as to dilute the solution of complexed surfactant in the stratum and decompose same to free said surfactant, thereby again effecting sorption of said surfactant on the stratum more remote from said well.

2. The process of claim 1 wherein said surfactant has the formula:

$$RO(CH_2CH_2O)_nCH_2CH_2OH$$

wherein $n$ is an integer ranging from 3 to 30 and R is an organic radical selected from the group consisting of alkaryl, fatty acid, and mixed acid residues, and the partial esters of hexatyl anhydride and a fatty acid and said alkaline earth metal halide is selected from the group consisting of the chlorides and bromides of calcium and magnesium.

3. The process of claim 1 wherein the aqueous liquid in step 4 is a solution of sodium chloride.

4. A process for producing oil from an oil-bearing subterranean stratum penetrated by an injection well and a production well which comprises the steps of:
   (1) injecting into said stratum thru said injection well, a solution of said surfactant in an aqueous medium selected from the group consisting of fresh water and an aqueous solution of sodium chloride, thereby causing sorption of said surfactant on the stratum and release of oil therefrom;
   (2) thereafter, injecting into said stratum thru said injection well, an aqueous solution of at least one alkaline earth metal halide selected from the group consisting of the chlorides and bromides of calcium and magnesium so as to convert said surfactant to the corresponding surfactant-alkaline earth metal halide complex and desorb same;
   (3) pushing the complex formed in step (2) deeper into said stratum by injection of fluid thru said well;
   (4) thereafter, injecting into said stratum thru said well aqueous liquid selected from the group consisting of fresh water and a solution of sodium chloride so as to dilute the solution of complexed surfactant in the stratum and decompose same to free said surfactant, thereby again effecting sorption of said surfactant on the stratum more remote from said well and freeing of additional oil;
   (5) repeating steps (2), (3), and (4); and
   (6) recovering oil driven into said production well by the foregoing steps.

5. A process for transporting a non-ionic surfactant thru a permeable subterranean stratum which comprises the steps of:
   (1) injecting into said stratum thru a well therein, an aqueous solution of an alkaline earth metal halide complex of a water soluble surfactant to contact an annulus of said stratum of substantial radial width with said complex;
   (2) thereafter, injecting thru said well into said annulus in contact with said complex an aqueous solution of sodium chloride so as to free said surfactant and effect sorption thereof on the stratum containing same;
   (3) thereafter, injecting into said annulus thru said well an aqueous solution of the alkaline earth metal halide of step (1) so as to again form said complex and move same into the stratum more remote from said well;
   (4) and repeating steps (2) and (3) to successively release said surfactant, effect sorption thereof, reform said complex, desorb said surfactant, and move same deeper into said stratum.

References Cited by the Examiner

UNITED STATES PATENTS 3,056,452  10/1962  Bernard et al. _____ 166—9 X
3,175,610   3/1965  Osoba _____ 166—9

CHARLES E. O'CONNELL, *Primary Examiner.*

S. J. NOVOSAD, *Assistant Examiner.*